July 5, 1960
A. V. C. DAVIS
2,943,870
RESILIENT TAKEUP MEANS FOR USE WITH
SCREW THREADED FASTENERS
Filed Jan. 15, 1954
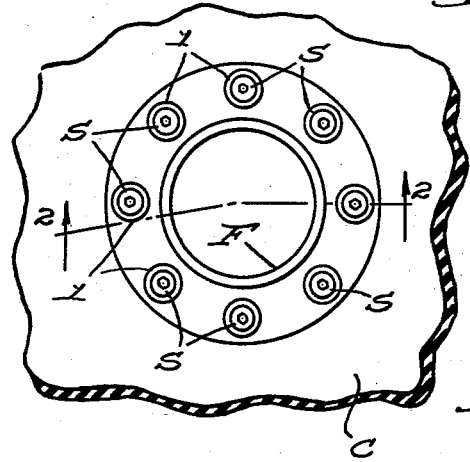
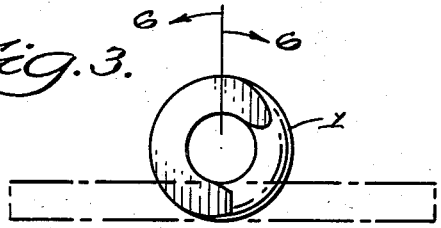
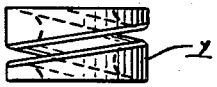
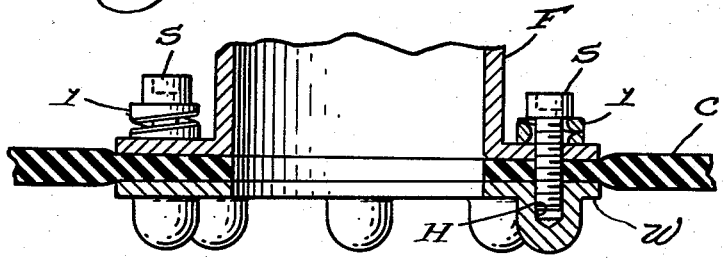
INVENTOR.
Allen V. C. Davis.
BY
Harold J. LeVesconte,
Atty.

United States Patent Office 2,943,870
Patented July 5, 1960

2,943,870

RESILIENT TAKEUP MEANS FOR USE WITH SCREW THREADED FASTENERS

Allen V. C. Davis, Burbank, Calif.
(5600 Alta Canyada Road, La Canada, Calif.)

Filed Jan. 15, 1954, Ser. No. 404,303

1 Claim. (Cl. 285—200)

This invention relates to spring takeup means for use with fasteners and more particularly to a resilient takeup means for use with bolts and screws characterized by capacity to exert an unusually high value of takeup force over a substantial range of movement and at the same time being of very small size.

An example of a use in which such action and capacity is required is in the inlet and outlet connections for fuel cells in aircraft. These fuel cells are generally formed of rubber or equivalent flexible and resilient material with an inner lining of a thin membrane of nylon or other material which is more resistant to the effects of the fuel than the material constituting the walls of the fuel cell. The inlet and outlet connections to the fuel cells generally comprise flanged fittings secured to the outer face of the cell wall in alignment with an opening therethrough by a series of screws extending through openings in the fitting flange and through the cell wall and threadedly engaging threaded holes in a washer on the inner face of the cell wall; the said threaded holes extending only from the face of the washer engaging the cell wall to prevent the possibility of fuel leakage along the threads of the screws. The cell wall material while initially resilient, tends to lose a part of such resilience through aging as well as through the effects of extremes of temperature deriving from altitude and heretofore unless frequent checks were made to be sure that all flange screws are sufficiently tight as measured by application of a torque indicating wrench, there was constant danger of fuel leaks developing with usually complete destruction of the plane and probable loss of life.

Within the allowable space limitations together with the extent of takeup action desired without such loss of exerted force as to allow leaks to exist no simple helical spring could be calculated to meet the specific requirements. The desired type of action was that of a volute spring in which the successive coils bottom on the base on which the large end of the spring rests, but space limitations prevented the use of such a spring.

With the foregoing considerations in mind, the principal object of the invention is the provision of a resilient takeup means for use with screw threaded fasteners such as screws and bolts characterized both by small size and by spring characteristics which resemble those of a volute spring.

Another object of the invention is to provide a spring takeup means for use with bolts and screws which in uncompressed condition resembles a simple helical spring, but which in use utilizes the end effect of the spring to achieve the high resistance to final compression and accordingly reacts in the same high degree in its action as a takeup.

With the foregoing objects in view, together with such additional objects and advantages as may subsequently appear, the invention resides in the provision of a spring takeup means for use with screws described by way of example in the following specification of one mode of execution of the invention; reference being had to the accompanying drawings which form a part of said specification and in which drawings:

Fig. 1 is a top plan view of a portion of a fuel cell showing the attachment of an orifice fitting thereto, Fig. 2 is a sectional view taken on the line 2—2 of Fig. 1 showing the invention applied thereto, Fig. 3 is an enlarged end elevation of a spring takeup means such as shown in Fig. 2, Figs. 4 and 5 are respectively, diametrically opposite side elevational views of the spring takeup means shown in Fig. 3, Fig. 6 is a flat development of the unstressed spring takeup means shown in Fig. 3 as though opened on the line 6—6; the figure being modified by the showing of the cross sections of the ends of the portions of the takeup at the line 6—6, Fig. 7 is a view similar to Fig. 6 but showing the relative positions of the portion of the takeup means at the time of the initial contact of the portions incident to compression by a bolt or screw passing therethrough, and Fig. 8 is a view similar to Figs. 6 and 7 but showing the action of the takeup means incident to final tightening with incident energization of those portions constituting the end effect of the takeup means.

Referring to the drawings, the illustrated embodiment of the invention comprises a helical spring 1 of approximately two complete coils; the ends of the coils being ground square with the axis of the spring and the thus flattened end portions extending through at least slightly more than and preferably considerably more than half of the circular extent of the end faces as shown in Fig. 3. In the illustrated embodiment, the spring is formed of round wire; a portion of the outer diameter of the wound spring thereafter being removed by grinding to meet specific space requirements, but for all practical purposes having to do with the action of the spring as a takeup means in the manner with which the invention is concerned, the said reduction of the outer diameter or other cross sectional form of the wire from which the spring is formed is of no significance. As formed for installation, the spring is given a helix angle that will produce a space between the adjacent sides of the convolutions which is substantially equal to half the distance through which the uniform takeup action is desired.

Referring to Figs. 1 and 2, the invention is shown applied to screws S securing a fitting F to the resilient, compressible wall of a fuel cell C; the screws passing through aligned holes in the fitting and cell wall and engaging threaded holes H in a washer W on the inner wall of the fuel cell wall. Each of said screws is provided with a takeup means embodying the invention; the screw at the left hand side of Fig. 2 being shown in the position occupied at the beginning of the tightening action and at the time at which the resistance to compression of the resilient cell wall is approximately equal to the resistance of the spring to initial compression, while the right hand screw is shown in completely tightened condition.

Referring next to Fig. 6 the spring is shown opened out into a straight line as indicated by the broken lines in Fig. 3; the figure being modified by the showing of the cross sections of the portions theoretically cut in thus opening the spring and the spring being in uncompressed condition as at the left hand side of Fig. 2. Due to the fact that the squared ends of the spring are each of greater than a half revolution in extent, as the screw S is tightened, the torsion in the body of the spring first causes the coils to be moved toward each other in the axial line of the spring until they touch at the point in the spring most remote from both ends of the wire, i.e., a point diametrically opposite the ends of the wire. In the illustrated embodiment of the invention, the screws are ¼" dia. having 28 threads per inch and the required torque to bring the coils into this initial contact as shown in Fig. 7 and with the attendant slight compression of the cell wall is about 20 inch-pounds. The continued tightening of the screw causes both ends of the spring to gradually bottom on the adjacent convolution progressively from the point of initial contact to the final complete closure of the spring. This action resembles the bottoming of the coils of a volute spring but differs in that identical action is taking place at both ends of the spring and in that the cross sections of the deflected ends is progressively decreasing as the deflected portions grow shorter in length. The actual result is that the torque values rise almost vertically until at about 80 inch pounds the entire length of the spring is completely closed as shown in Fig. 8. The ends of the closed spring are of course no longer in parallel relation, but in the illustrated use of the invention, the screw is distorted so that the underside of the head is parallel with the outer end of the spring and there may also be some accommodating deflection of both the washer and the fitting flange. While the illustrated spring has a total range of compressibility of about, say 0.075", in the actual illustrated use, the fuel cells are discarded when by reason of aging, the engaged portion of the cell wall has decreased to a normal thickness of about, say, 0.030" to 0.040" less than its original thickness and at such time these springs will have opened up to the point at which about 60 to 65 inch pounds of torque would have initially brought them. Consequently, the force exerted by the screws in holding the fitting tightly clamped to the fuel cell has not been so adversely affected by such shrinkage of the cell wall material as to allow leakage to occur. While a spring of two complete turns appears most desirable, some range in this respect is permissible between, say, 1¾ turns and about 2½ turns. Likewise, the size of wire and angle of helix may be varied to suit the requirements of individual installations for other uses. The invention is not intended as a rotation preventing means but rather as a means to provide a resilient takeup means of small overall size which is capable of exerting an unusually high value of takeup force between screw or bolt connected parts.

Therefore, the invention is not to be deemed to be limited to the exact construction hereinabove disclosed by way of specific example, but to include as well all such modifications in size and shape as well as of the cross section of the spring material as shall act in the hereinbefore described manner for the purpose of providing a spring takeup for fastening devices.

I claim:

In combination, a flexible and resilient fuel cell for aircraft having an orifice in a wall of said fuel cell, a metallic fitting attached to the outer face of said wall in alignment with said orifice, and means for securing said fitting to said wall comprising a flange on said fitting engaging the outer face of said wall, a washer of substantially the same inner and outer diameters as said flange on the inner face of said wall and having a series of radially spaced threaded holes formed in the wall engaging face only thereof, a series of bolts extending through said flange and said wall and threadedly engaging said threaded holes, and a plurality of resilient takeup means mounted one each on each of said bolts between the head thereof and the outer surface of said flange; each of said takeup means comprising a helical spring of substantially two complete revolutions and having an inner diameter slightly larger than the screw or bolt with which it is to be used; said spring, when uncompressed having flat end faces each of greater than a half revolution in extent and said faces being disposed in parallel planes extending at right angles to the axis of the spring and the adjacent sides of the convolutions being spaced from each other to an extent that is substantially greater than the range through which said spring is intended to effect takeup action; said spring when subjected to compression forces first responding by bodily movement of said ends toward each other in the line of the axis of the spring until contact of the convolutions at a point diametrically opposite the ends of the spring and then responding to further compression by progressive deflection of the ends of the spring into contact with the adjacent convolution from said first point of contact until the decrease in length of the uncontacting portion of the ends reaches zero; the rate of increase of the torque required to deflect said ends after said initial contact being substantially greater than the rate of increase of torque required to effect said initial contact of the convolutions of the spring.

References Cited in the file of this patent

UNITED STATES PATENTS

| | | |
|---|---|---|
| 501,052 | Brown | July 11, 1893 |
| 1,114,768 | Hyde | Oct. 27, 1914 |
| 1,172,009 | Compton | Feb. 15, 1916 |
| 1,637,524 | Harriman | Aug. 2, 1927 |
| 2,231,771 | Murphy | Feb. 11, 1941 |
| 2,441,009 | Cunningham | May 4, 1948 |

FOREIGN PATENTS

| | | |
|---|---|---|
| 10,192 | Italy | Mar. 31, 1879 |